United States Patent [19]

Monsorno

[11] Patent Number: 5,576,926
[45] Date of Patent: Nov. 19, 1996

[54] CAPACITOR WITH BURIED ISOLATED ELECTRODE

[75] Inventor: Richard Monsorno, Jacksonville, Fla.

[73] Assignee: American Technical Ceramics Corporation, Huntington Station, N.Y.

[21] Appl. No.: 415,499

[22] Filed: Apr. 3, 1995

[51] Int. Cl.$^6$ ................................. H01G 4/005
[52] U.S. Cl. .................. 361/303; 361/311; 361/307; 361/308.1; 361/312; 361/321.2; 29/25.42
[58] Field of Search .................. 361/321.4, 321.6, 361/321.2, 301.1, 306.3, 307, 308.1, 309, 310, 311–313, 293; 29/25.42

[56] References Cited

U.S. PATENT DOCUMENTS

| | | | |
|---|---|---|---|
| 3,648,132 | 3/1972 | Rayburn | 361/271 |
| 4,193,106 | 3/1980 | Coleman | 361/275.4 |
| 4,887,186 | 12/1989 | Takeda et al. | 361/321 |
| 4,977,485 | 12/1990 | Mori et al. | 361/321 |
| 5,014,158 | 5/1991 | Nishimura et al. | 361/321 |
| 5,170,317 | 12/1992 | Yamada et al. | 361/321.2 |

Primary Examiner—Leo P. Picard
Assistant Examiner—Anthony Dinkins
Attorney, Agent, or Firm—Charles E. Baxley, Esq.

[57] ABSTRACT

A capacitor includes a planar electrode layer which is mounted between a pair of dielectric layers. The electrode layer generally is centered inwardly with respect to the dielectric layers leaving an outward margin of dielectric material. One of the dielectric layers has two spaced apart contact members, each having a different polarity from the other. The electrode layer is isolated from electrical contact with any conductor and is buried within the dielectric layers. The electrode layer, in combination with the dielectric layer on which the contact members are mounted and the contact members, allow development of a selected value of capacitance between the contact members. Providing trimmed contact members as well as controlling their size and spacing allow for convenient preselection of desired operative characteristics of the capacitor. The contact members could be positioned on a substrate to which a buried electrode is mounted.

20 Claims, 4 Drawing Sheets

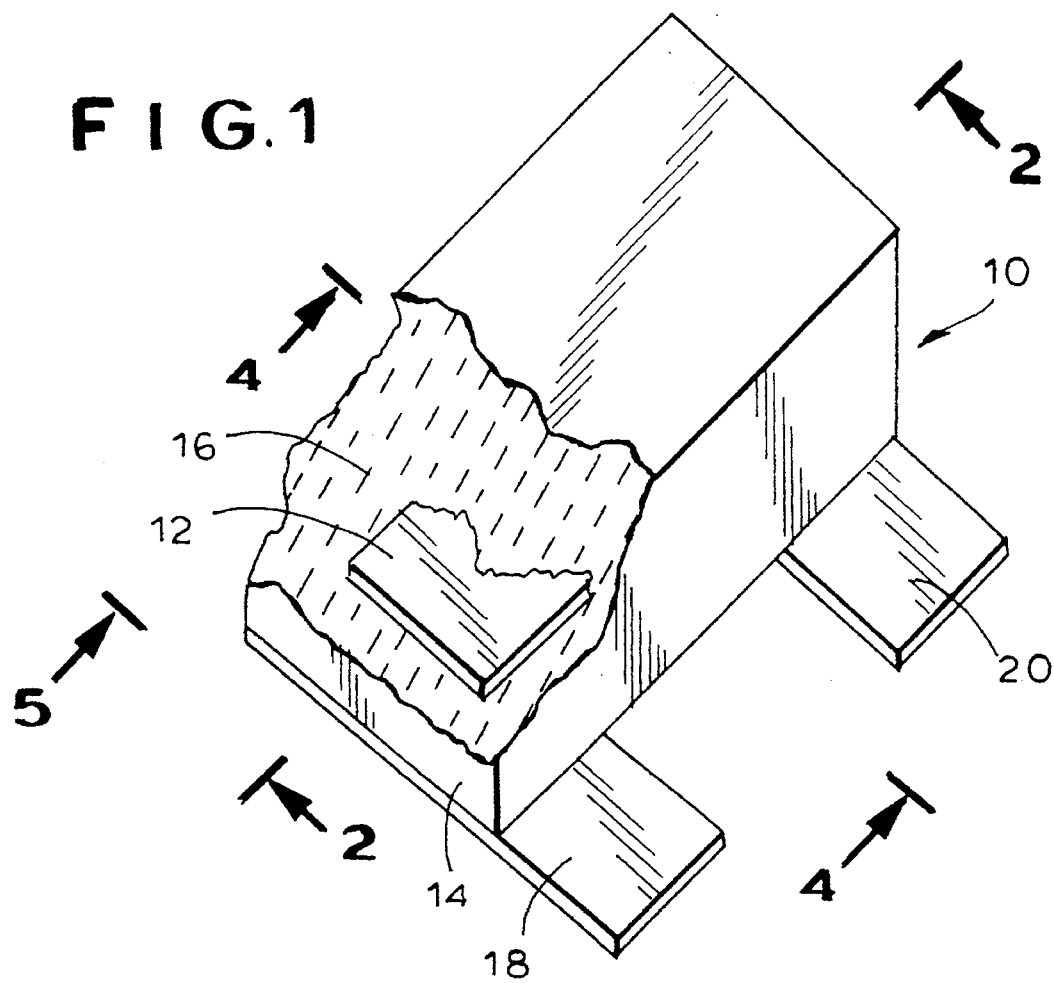
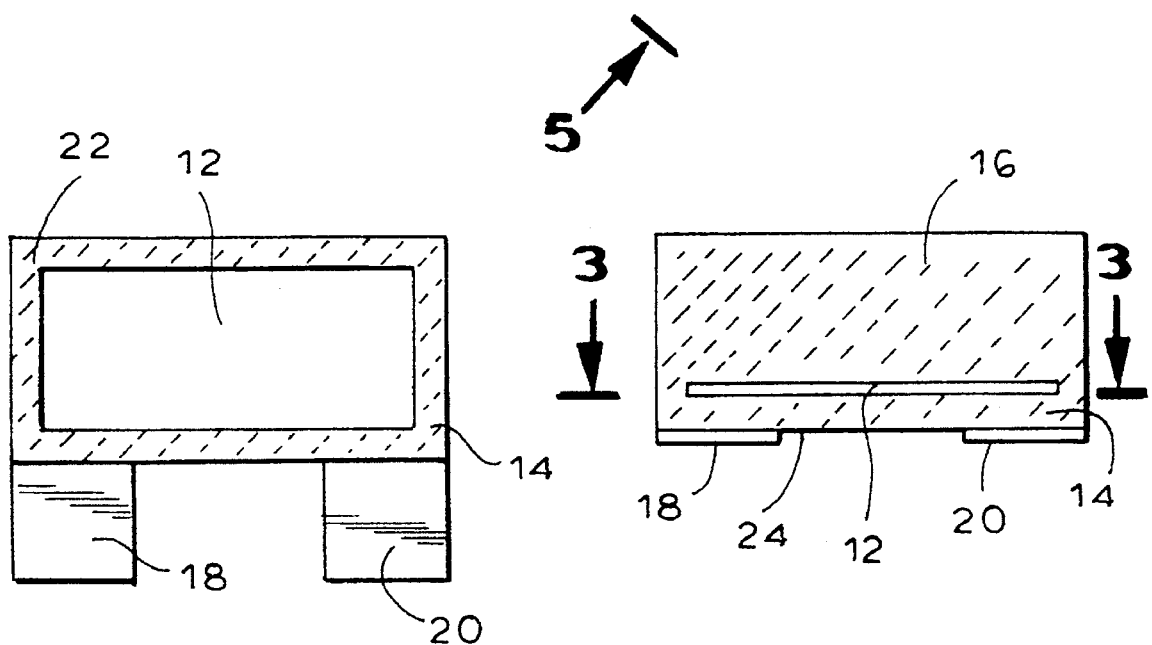

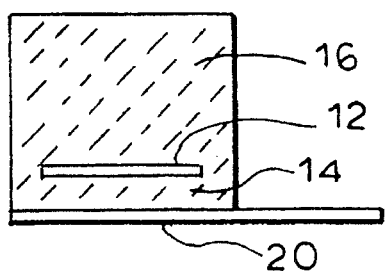
FIG.4
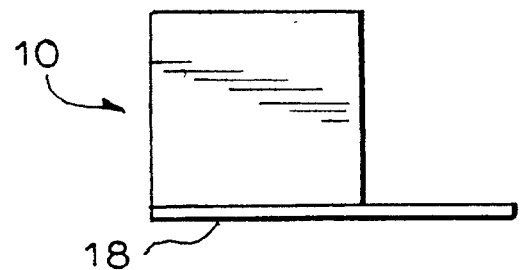
FIG.5
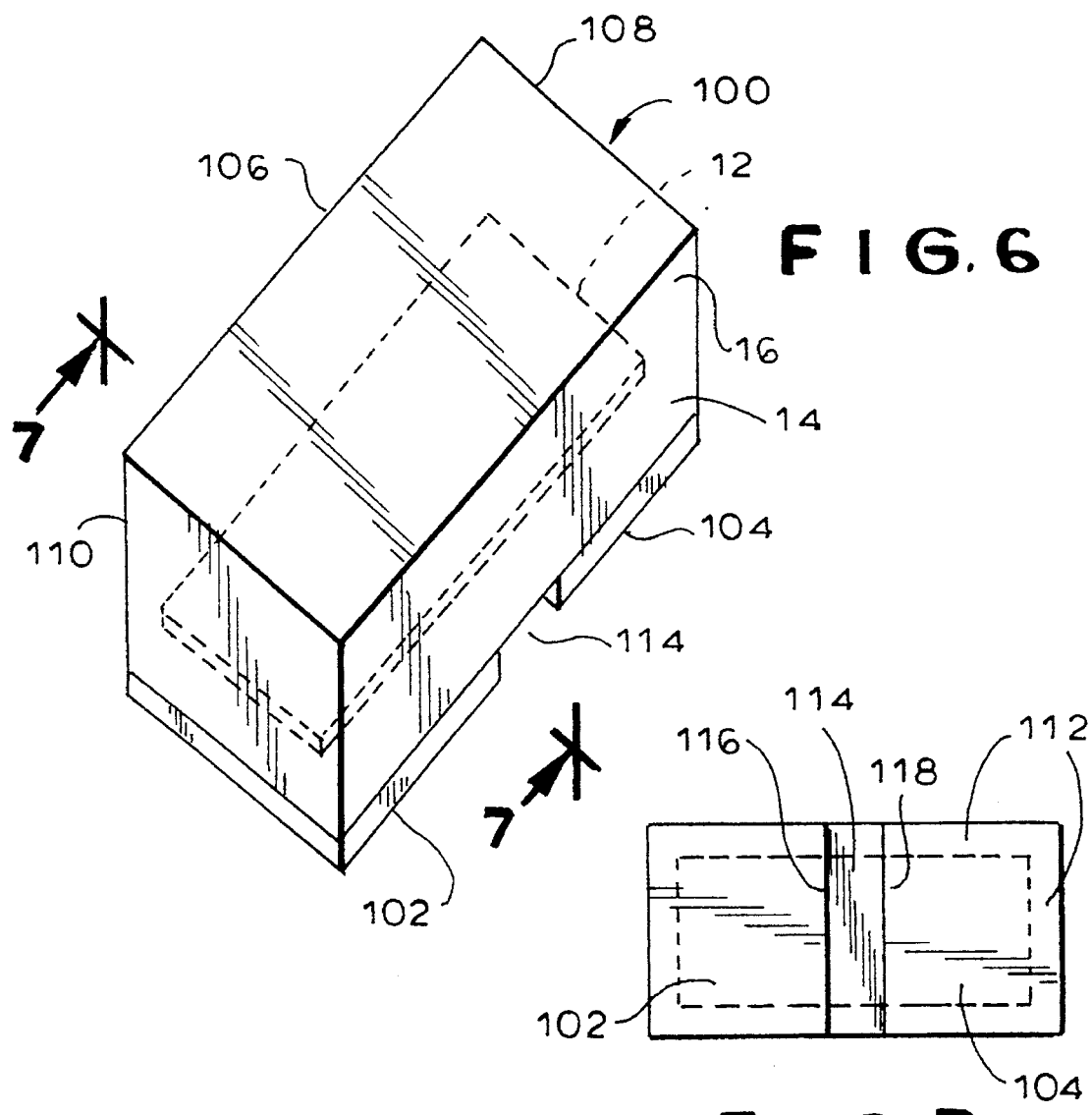
FIG.6
FIG.7

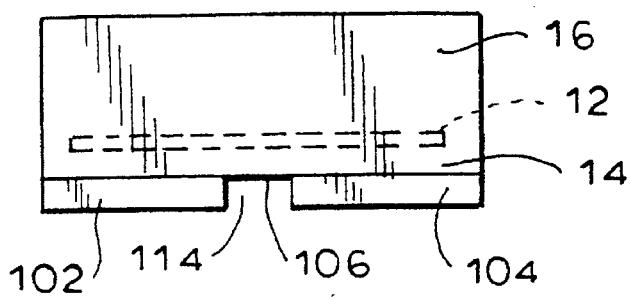
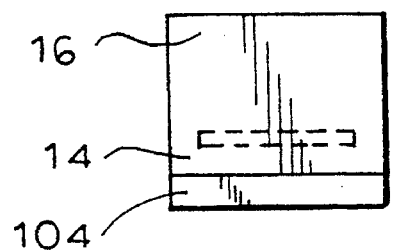
FIG. 8   FIG. 9
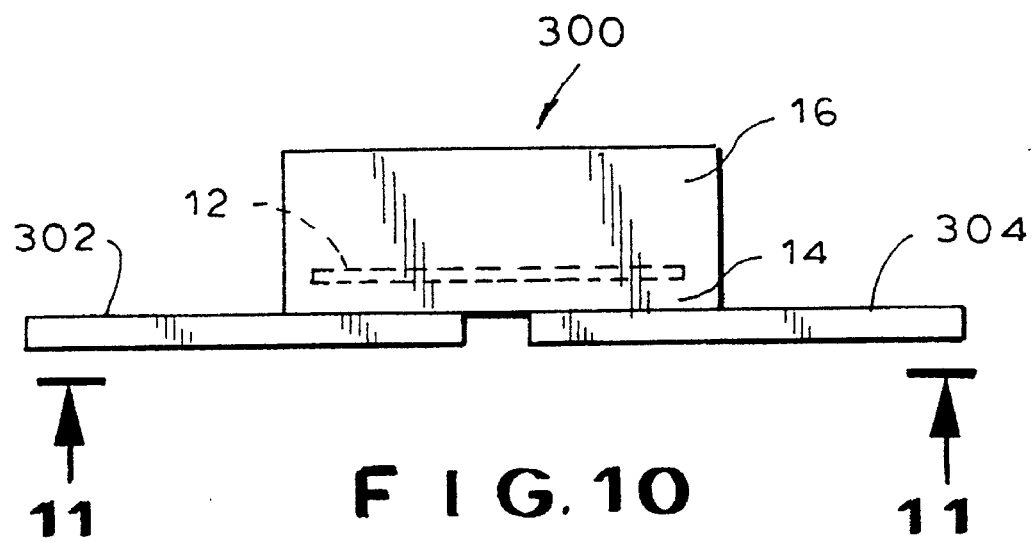
FIG. 10
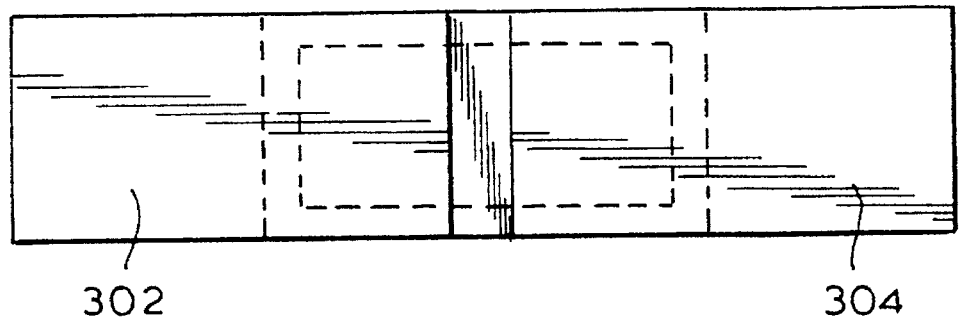
FIG. 11

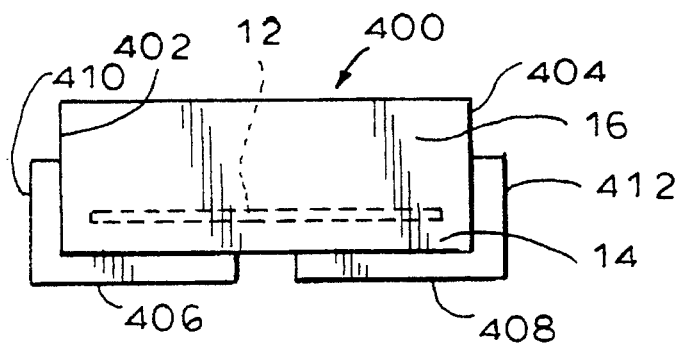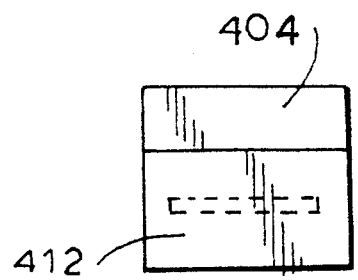
F I G.12    F I G.13
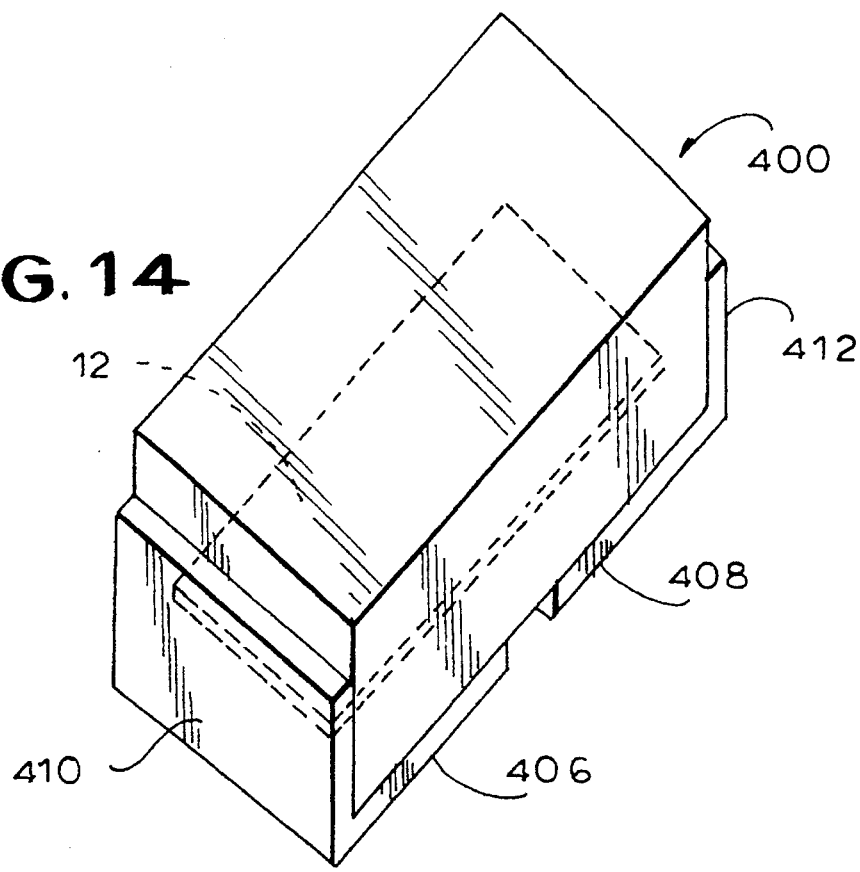
F I G.14
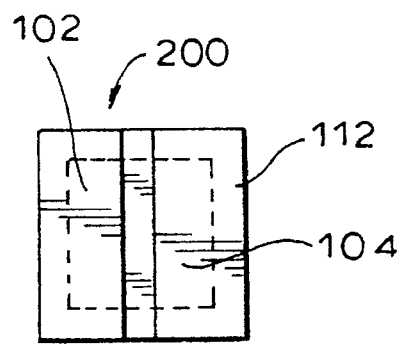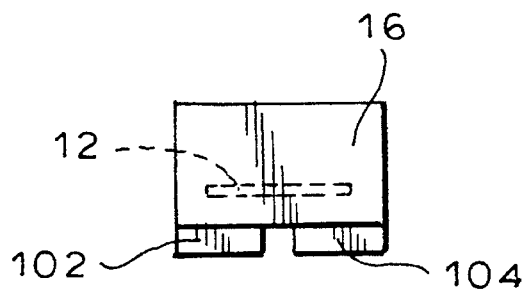
F I G.15    F I G.16

5,576,926

1

CAPACITOR WITH BURIED ISOLATED ELECTRODE

BACKGROUND OF INVENTION

This invention relates generally to capacitors and more particularly to a ceramic capacitor which utilizes a buried layer.

Prior art relating to solid state capacitors includes such patents as U.S. Pat. No. 4,665,465 to Tanabe and U.S. Pat. No. 5,107,394 to Naito et al. Construction of these capacitors includes multiple electrode layers which are fastened by means of a soldering process to a mechanical end cap. The soldering process introduces a degree of unreliability as a result of residual stresses formed in the capacitor during its manufacture. Additional unreliability results from stresses which are imposed on a solder joint due to differential rates of thermal expansion and contraction of various components of the capacitor; including the electrode, the dielectric material, the solder material and the end cap; when the capacitor is exposed to temperature variations and extremes during use.

OBJECTS AND SUMMARY OF INVENTION

It is an object of the present invention to provide a buried layer capacitor that is particularly effective at very high frequencies.

Another object of the invention is to provide a buried layer capacitor which is highly reliable.

Another object of the invention is to provide a buried layer capacitor which is capable of highly reliable operation over a broad range of operating temperatures.

Yet another object of the invention is to provide a buried layer capacitor which can be manufactured in quantity at a low unit cost while maintaining high levels of quality.

The foregoing and other objects and advantages of the invention will appear more clearly hereinafter.

In accordance with the invention there is provided a buried layer capacitor which includes a planar electrode layer mounted between a pair of dielectric layers. Length and width dimensions of the dielectric layers are slightly greater than corresponding length and width dimensions of the electrode layer and the electrode layer generally is centered with respect to the dielectric layers. One layer of the pair of dielectric layers has a pair of spaced apart contact members, each having a different polarity from the other. The dielectric layer which is attached to the contact member has a selected thickness which allows the dielectric layer, in combination with the electrode layer, to develop a desired value of capacitance between the contact members.

In an alternative embodiment of the invention, the pair of spaced apart contact members is replaced by a pair of metallized areas (each having a different polarity from the other) and the dielectric layer in combination with the electrode layer develop a desired value of capacitance between the two metallized areas. The metallized areas facilitate mounting the buried layer capacitor on a circuit board while using minimum surface area of the circuit board.

In another alternative embodiment of the invention, the metallized areas extend onto end portions of the dielectric layer in order to facilitate testing of the capacitor.

2

DESCRIPTION OF THE DRAWINGS

Other important objects and advantages of the invention will be apparent from the following detailed description, taken in connection with an accompanying drawings in which:

FIG. 1 is a generally downwardly looking perspective view of a buried layer capacitor made in accordance with the present invention and having a portion of the capacitor shown broken away to reveal details of internal construction;

FIG. 2 is an elevational cross-sectional view taken along line 2—2 of FIG. 1;

FIG. 3 is a planar cross-sectional view taken along line 3—3 of FIG. 2;

FIG. 4 is an elevational cross-sectional view taken along the line 4—4 of FIG. 1;

FIG. 5 is a side elevational view taken along the line 5—5 of FIG. 1;

FIG. 6 is a generally downwardly looking perspective view of an alternative embodiment of the buried layer capacitor of FIG. 1;

FIG. 7 is a bottom planar view of the capacitor of FIG. 6 taken along the line 7—7 of FIG. 6;

FIG. 8 is a side elevational view of the capacitor of FIG. 6;

FIG. 9 is an end elevational view of the capacitor of FIG. 6;

FIG. 10 is a side elevational view of an alternative embodiment of the buried layer capacitor of FIG. 1, incorporating a pair of axial leads;

FIG. 11 is a bottom planar view of the capacitor of FIG. 10, taken along line 11—11 of FIG. 10;

FIG. 12 is a side elevational view of another embodiment of the buried layer capacitor of FIG. 1, incorporating metallized portions, each having a different polarity from the other, on the end surfaces of the dielectric layers;

FIG. 13 is an end elevational view of the capacitor of FIG. 12;

FIG. 14 is a perspective view of the capacitor of FIG. 12;

FIG. 15 is a bottom planar view of another embodiment of the buried layer capacitor of FIG. 1, similar to FIG. 7 and incorporating a square configuration; and FIG. 16 is an end elevational view of the capacitor of FIG. 15.

DETAILED DESCRIPTION OF THE INVENTION

With reference to the drawings, wherein like reference numbers designate like or corresponding parts throughout, there is shown in FIG. 1 a buried layer capacitor generally designated 10, made in accordance with the present invention, which includes an electrode layer 12, a first dielectric layer 14, a second dielectric layer 16 and a pair of contact members 18, 20, each having a different polarity from the other.

The dielectric layers 14, 16 are generally rectangular and as is shown in FIGS. 1 and 3, the electrode layer 12 also is generally rectangular, with length and width dimensions which are somewhat smaller than corresponding length and width dimensions of the dielectric layers 14, 16. The electrode layer 12 is planar and generally is centered relative to the dielectric layers 14, 16 resulting in a border, generally designated by the reference numeral 22, which surrounds the periphery of the electrode layer 12. The electrode layer 12 thus is completely contained or buried in the dielectric layers 14, 16. The electrode layer may be silver, gold, nickel, copper or palladium or another high conductivity metal.

The contacts members 18, 20 are attached to a bottom surface 24 of the dielectric layer 14. The contacts members 18, 20 are each planar and are made of any one of a number of metals which have desirable combination of stiffness and conductivity. Appropriate materials for the contact members are to be copper and silver.

The dielectric layers 14, 16 are made of any one of a number of dielectric materials such as magnesium titanate, strontium titanate or barium titanate.

As is best seen from FIG. 1, the first dielectric layer 14 is disposed between the electrode layer 12 and the contacts members 18, 20. The contacts members 18, 20 have a preferred thickness which is in the order of 0.01 inches. The dielectric layer 14, in combination with the electrode layer 12 and the contacts members 18, 20, (each having a different polarity from the other) allow development of capacitance between the contacts members 18, 20.

The buried layer capacitor 10 of FIGS. 1–5 typically has the following dimensions which should be considered as given by way of illustration only and should not be considered as limiting in any way. Overall length of the capacitor 10 is in an order of 0.05 inches, its width is in an order of 0.05 inches, its height is in an order of 0.02 inches. Thickness of the dielectric layer 14 is in an order of 0.003 inches and thickness of the dielectric layer 16 is in an order of 0.017 inches.

The thickness of the dielectric layer 14 typically may range from 0.0005 inches to 0.01 inches in order to vary capacitance and the voltage rating of the capacitor 10.

The dimensions of the electrode layer 12 are typically as follows: length 0.045 inches, width 0.045 inches, and thickness 0.0001 inches.

An alternative embodiment of a capacitor generally designated 100 according to the invention is shown in FIGS. 6 and 7. In the capacitor embodiment 100, the contact members 18, 20 are replaced by a pair of metallized areas 102, 104 on a bottom surface 106 of the capacitor. The metallized areas 102, 104 function as terminations, each having a different polarity from the other, and facilitate mounting of the capacitor 100 directly to a printed circuit board. Elimination of the contacts members 18, 20 results in use of a minimum amount of circuit board area for the capacitor 100.

The capacitor 100 includes a first dielectric layer 14 and a second dielectric layer 16 and an electrode layer 12, each of which are generally similar to corresponding parts which have been described in connection with the embodiment depicted in FIGS. 1–5.

The capacitor 100 typically includes an electrode layer 12 made of palladium and metallized areas 102, 104 or terminals made of silver.

The following physical dimensions and capacitance values for the buried layer capacitor 100 should be considered as given by way of example and should not be considered as limiting in any way. The length dimension (as measured along edge 106) may range from 0.040 inches to 0.50 inches; the width (as measured along edge 108) may range from 0.020 inches to 0.50 inches; and the thickness (as measured along edge 110) may range from 0.010 to 0.10 inches.

Most typically, the capacitor 100 is manufactured in the following sizes:

TABLE 1

Typical Capacitor Sizes

| SIZE | LENGTH (inches) | WIDTH (inches) | THICKNESS (inches) |
|---|---|---|---|
| A | 0.060 | 0.050 | 0.030 |
| B | 0.120 | 0.100 | 0.080 |

The margin or barrier at the sides and at the ends of the electrode layer 12 as indicated by the reference numeral 112 in FIG. 7 may range from 0.005 inches to 0.010 inches. The gap between the terminations 102, 104 as indicated by the reference numeral 114 in FIGS. 6, 7 and 8 may range from 0.005 inches to 0.020 inches. The thickness of the dielectric layer 14 between the electrode layer 12 and the terminations 102, 104 may range from less than 0.001 inches to 0.010 inches.

In another alternative configuration generally designated 200 shown in FIG. 15, the length and width dimensions are made equal, thereby resulting in a the square configuration of the buried layer capacitor 200.

Typical values for capacitance for a buried layer capacitor 100 having a size designated as Size A in Table 1 for various values of dielectric thickness, margin size, gap spacing and dielectric constant are shown in Table 2. The capacitance values shown are in pico Farads (pF) as measured between terminations 102, 104.

TABLE 2

Capacitance Values for Buried Layer Capacitors

| DIELECTRIC THICKNESS (inches) | MARGIN (inches) | GAP (inches) | DIELECTRIC CONSTANT | | | | |
|---|---|---|---|---|---|---|---|
| | | | K = 13 | K = 23 | K = 65 | K = 90 | K = 4000 |
| 0.001 | 0.005 | 0.010 | 1.1 pF | 2.3 pF | 5.7 pF | 7.8 pF | 351 pF |
| 0.010 | 0.005 | 0.010 | 0.1 pF | 0.4 pF | | | |
| 0.001 | 0.010 | 0.010 | 0.4 pF | | | | |

An important feature of the buried layer capacitor 100 is the ability to adjust or trim the value of capacitance in an efficient manner. The capacitance of the buried layer capacitor 100 can be adjusted by adjusting the gap 114 between the terminations 102, 104 each having a different polarity from the other. This adjustment may be performed as part of a final manufacturing process and eliminates need for contacting and trimming the electrode layer 12. This adjustment may be accomplished by trimming or cutting away a small portion of the terminations along the edges 116, 118 using conventional abrasion cutting or laser cutting equipment.

FIGS. 10 and 11 show an alternative embodiment of the buried layer capacitor contacts members 300 which incorporates axial leads contacts members 302, 304. The axial contacts members 302, 304 provide an alternative mounting configuration.

FIGS. 12–14 show another alternate embodiment of the buried layer capacitor generally designated 400 in which the metallized areas 102, 104 or cathode and anode shown in FIG. 6 have been modified to extend onto the end surfaces 402, 404 of the dielectric layers 14, 16. The terminations 406, 408 on the buried layer capacitor 400 facilitate the use of test equipment in which probes are placed on surfaces 410, 412 in order to measure performance characteristics of the capacitor 400.

The relatively thicker dielectric layer 16 contributes to overall ruggedness of the buried layer capacitors generally designated 10, 100, 200, 300, 400, respectively thicker dielectric layer 16. This makes it possible to handle these capacitors using conventional production type automatic handling equipment, even though the dielectric layer 14 is in the range of 0.0001 inches to 0.01 inches.

A key feature of the buried layer capacitors generally designate 10, 100, 200, 300, 400, respectively is their performances at very high frequencies. A typical capacitor made according to the prior art is useful up to approximately 11 gigaHertz (11 GHz). Tests performed on capacitors made according to the present invention indicate useful performance to approximately 20 GHz.

The foregoing specific embodiments of the present invention as set forth in the specification herein are for illustrative purposes only. Various deviations and modifications may be made within the spirit and scope of this invention, without departing from a main theme thereof.

What is claimed is:

1. A buried layer capacitor comprising:

a first dielectric layer, with said first dielectric layer having a length dimension and a width dimension, and with said first dielectric layer having a first surface and a second surface;

an electrode layer, with said electrode layer having a length dimension and a width dimension, with said length and width dimensions of said electrode layer smaller than said length and width dimensions respectively of said first dielectric layer, and with said electrode layer mounted on said first surface of said first dielectric layer, spaced from contact with any electrical conductor;

a second dielectric layer, with said second dielectric layer having a length dimension and a width dimension and with said length and width dimensions of said second dielectric layer coextensive with said length and width dimensions respectively of said first dielectric layer;

two spaced apart contact members with said contact members in contact with said second surface of said first dielectric layer, each of said contact members provided with a different polarity from that of said other contact member.

2. A buried layer capacitor according to claim 1, in which said electrode layer is rectangular.

3. A buried layer capacitor according to claim 1, in which said first and said second dielectric layers are each rectangular.

4. A buried layer capacitor according to claim 1, in which each of said contact members comprises a planar rectangular member.

5. A buried layer capacitor according to claim 1, in which each of said contact members projects beyond said width dimension of said first dielectric layer.

6. A buried layer capacitor according to claim 1, in which said electrode layer is square.

7. A buried layer capacitor according to claim 1, in which said first and said second dielectric layers are each square.

8. A buried layer capacitor according to claim 1, in which each of said contact members projects beyond said length dimension of said first dielectric layer.

9. A method for producing a capacitor and comprising steps of:

providing a first thin dielectric layer having a length dimension and a width dimension and a first surface and a second surface;

providing an electrode layer with length and width dimensions smaller respectively than those of said first dielectric layer, the electrode layer mounted centrally on the first surface of the first dielectric layer with said electrode layer spaced from contact with any electrical conductor;

providing a second dielectric layer on the electrode layer on the opposite side from the first dielectric layer for ruggedness, the second dielectric layer having length and width dimensions coextensive with those of said first dielectric layer so that said dielectric layers combine to describe a margin outward of the electrode layer;

providing two spaced apart electrical contact members in contact with the second surface of the first dielectric layer, each of said contact members being provided with a different polarity from that of said other contact member.

10. A buried layer capacitor according to claim 9, in which each of said pair of electrically conductive areas is rectangular.

11. A buried layer capacitor according to claim 9, in which each of said electrically conductive areas comprises a metallized area.

12. A buried layer capacitor according to claim 9, in which said electrode layer is rectangular.

13. A buried layer capacitor according to claim 9, in which said first and second dielectric layers are each rectangular.

14. A buried layer capacitor according to claim 9, in which said electrode layer is square.

15. A buried layer capacitor according to claim 9, in which said first and said second dielectric layers are each square.

16. A buried layer capacitor according to claim 9, in which said first dielectric layer further comprises a pair of end portions and said second dielectric layer further comprises a pair of end portions and in which each of said electrically conductive areas extends onto an end portion of said first and second dielectric layers.

17. A method for producing a capacitor and comprising steps of:

providing a first thin dielectric layer having a length dimension and a width dimension and a first surface and a second surface;

providing an electrode layer with length and width dimensions smaller respectively than those of said first dielectric layer, the electrode layer mounted centrally on the top surface of the first dielectric layer with said electrode layer spaced from contact with any electrical conductor;

providing a second dielectric layer on the electrode layer on the opposite side from the first dielectric layer for ruggedness, the second dielectric layer having length and width dimensions coextensive with those of said first dielectric layer so that said dielectric layers combine to describe a margin outward of the electrode layer;

providing two spaced apart electrical contact members in contact with the second surface of the first dielectric layer, each of said contact members being provided with a different polarity from that of said other contact member.

18. A method for producing a capacitor and comprising steps of:

providing a first thin dielectric layer having a length dimension and a width dimension and a first surface and a second surface;

providing an electrode layer with length and width dimensions smaller respectively than those of said first dielectric layer, the electrode layer mounted centrally on the top surface of the first dielectric layer with said electrode layer spaced from contact with any electrical conductor;

providing a second dielectric layer on the electrode layer on the opposite side from the first dielectric layer for ruggedness, the second dielectric layer having length and width dimensions coextensive with those of said first dielectric layer so that said dielectric layers combine to describe a margin outward of the electrode layer;

providing two trimmed spaced apart electrical contact members on the second surface of the first dielectric layer, each of said contact members being provided with a different polarity from that of said other contact member so as to provide predetermined operative characteristics to the capacitor.

19. A method for producing a capacitor and comprising steps of:

providing a first thin dielectric layer having a length dimension and a width dimension and a first surface and a second surface;

providing an electrode layer with length and width dimensions smaller respectively than those of said first dielectric layer, the electrode layer mounted centrally on the top surface of the first dielectric layer with said electrode layer spaced from contact with any electrical conductor;

providing a second dielectric layer on the electrode layer on the opposite side from the first dielectric layer for ruggedness, the second dielectric layer having length and width dimensions coextensive with those of said first dielectric layer so that said dielectric layers combine to describe a margin outward of the electrode layer;

providing two spaced apart electrical contact members on the second surface of the first dielectric layer, each of said contact members being provided with a different polarity from that of said other contact member, the contact members sized and spaced so as to provide predetermined operative characteristics to the capacitor.

20. A buried electrode for use with a substrate having two spaced apart contact members with one of said contact members being provided with different polarities each from the other, said buried electrode and contact members to cooperate as a buried layer capacitor, the buried electrode comprising:

a first dielectric layer, with said first dielectric layer having a length dimension and a width dimension, and with said first dielectric layer having a first surface and a second surface;

an electrode layer, with said electrode layer having a length dimension and a width dimension, with said length and width dimensions of said electrode layer smaller than said length and width dimensions respectively of said first dielectric layer, and with said electrode layer mounted on said first surface of said first dielectric layer, spaced from contact with any electrical conductor;

a second dielectric layer, with said second dielectric layer having a length dimension and a width dimension and with said length and width dimensions of said second dielectric layer coextensive with said length and width dimensions of said first dielectric layer;

said second surface of said first dielectric layer engageable with the substrate with the electrode layer spanning the contact members so as to form the buried layer capacitor.

* * * * *